United States Patent [19]

Robertson et al.

[11] Patent Number: 4,603,261
[45] Date of Patent: Jul. 29, 1986

[54] DOCUMENT READING APPARATUS

[75] Inventors: David K. Robertson, Mound; William A. Shoquist, Prior Lake, both of Minn.

[73] Assignee: Hei, Inc., Victoria, Minn.

[21] Appl. No.: 601,788

[22] Filed: Apr. 19, 1984

[51] Int. Cl.$^4$ .............................................. G06K 7/10
[52] U.S. Cl. ................................................... 250/566
[58] Field of Search ............... 250/566, 569, 570, 434; 235/458

[56] References Cited

U.S. PATENT DOCUMENTS

| | | | |
|---|---|---|---|
| 3,493,728 | 2/1970 | Braden, Jr. et al. | 235/458 |
| 3,562,492 | 2/1971 | Kirkowski et al. | 235/446 |
| 3,720,809 | 3/1973 | Pot | 235/458 |
| 3,735,093 | 5/1973 | Kendall et al. | 235/434 |
| 3,878,366 | 4/1975 | Austin | 235/458 |
| 4,160,169 | 7/1979 | Endicott, Jr. et al. | 250/570 |

*Primary Examiner*—Gene Wan
*Attorney, Agent, or Firm*—Orrin M. Haugen; Thomas J. Nikolai

[57] ABSTRACT

A compact document reading station for transporting a document and sensing indicia carried on the document. First and second substantially identical box-like housing halves, each with four sides, a generally closed bottom and an open top, contain an in-line arrangement of a motor and a drive roller powered by that motor as well as an off-set driven pinch roller. The rollers which partially extend through openings formed through the generally closed bottom and the housing halves are juxtaposed and connected together with the drive roller of one housing half cooperating with the driven pinch roller of the other housing half. Located between the roller openings in the bottom of each housing half is a row of spaced-apart apertures through which a portion of a plurality of photo-optic transducing head assemblies project. Each such transducing head assembly includes a hybrid circuit card having terminal pins which mate with connectors disposed on printed circuit cards which, when in place, act as covers for the open tops of the housing halves. One printed circuit card includes the components and interconnections for controlling the operation of the dual drive motors, and the other card includes the components and interconnections comprising the reading electronics which carry the data from the light-sensing elements of the plural photo-optic transducing heads.

11 Claims, 5 Drawing Figures

DOCUMENT READING APPARATUS

BACKGROUND OF THE INVENTION

This invention relates generally to document sensing devices for use with digital data processing systems, and more specifically to the design of a compact, rugged card reader for transporting an indiciabearing card past a reading station where the digital information recorded on the card is sensed.

DISCUSSION OF THE PRIOR ART

Since the inception of data processing machinery, a common medium for recording data for later entry into a computer or other data handling devices has been the punched or printed card. Here, information is recorded by the presence of a hole or mark at predetermined row and column locations on the card. When it is desired to read that information, it is necessary to transport the card past a reading station where the holes or marks are sensed and converted to information pulse patterns usable by the data processing system in which the card reader is employed.

A typical card reader comprises one or more drive/pinch roller pairs whose individual elements are disposed on opposite sides of the card's travel path. Positioned in the path is a reading station where mechanical fingers or photo-optic devices are arranged in a row extending transversely to the direction of travel of the card along the path, the number of such devices corresponding to the number of recording positions in a column. Prior art designs generally incorporate a single motor which is side-mounted relative to the card reading mechanism and a belt and pulley arrangement is used to couple the shaft of the motor to the card reader's drive rollers. Such a drive arrangement not only increases the physical size of the reader assembly, but also significantly adds to its cost.

Card readers are also now embodied in a wide variety of devices that are exposed to somewhat hostile environments. For example, subway system turnstiles, race track betting windows, and various vending machines may incorporate a card reader for receiving a user's card and developing pulse groupings corresponding to the data read therefrom and for causing various machine operations to be performed. As such, it is important in applications of this type that the card reader assembly be extremely rugged, that it be easy to maintain and that it exhibit high mean time between failures.

The present invention provides just such a card reading system. By incorporating a unique arrangement of a motor/drive roller assembly, the need for belts and pulleys mounted external to the card reader housing is obviated. The electronic circuit for controlling the motors and for sensing the recorded data and producing the digital output pulses corresponding thereto are rigidly mounted in frames that are tightly held within a housing by being sandwiched between the sensing station and a printed circuit card carrying the electrical connectors for establishing connections to the electronic circuits of the sensing devices.

Further size reduction is occasioned by the manner in which the card transport drive rollers and associated motors telescopingly fit together such that the drive motor is at least partially surrounded by the roller which it is driving. This allows the card reading assembly to be packaged in a small cube-like housing, the exterior of which is free of pulleys, belts and the like.

OBJECTS

Accordingly, it is the principal object of the present invention to provide a new and improved card reader assembly for use in data processing applications.

Another object of the invention is to provide a card reader assembly which is compact, rugged and highly reliable over prolonged periods of use.

Still another object of the invention is to provide a card reader assembly in which the card advancing drive rollers are motor driven directly rather than by way of gears or belt/pulley transmissions.

Yet another object of the invention is to provide a card reader assembly in which the housing is formed from identical halves, thus simplifying manufacture.

Another object of the invention is to provide a card reader assembly of the type described which obviates the need for adjustments to accommodate cards of differing thickness.

A further object of the invention is to provide a card reader assembly in which the card advancing drive motors and the data sensing transducing head assemblies are rigidly supported whereby malfunction due to shock and vibration is minimized.

These and other important advantages and objects of the invention will become apparent to those skilled in the art from the following detailed description of a preferred embodiment, especially when considered in conjunction with the accompanying drawings in which like numerals in the several views refer to corresponding parts.

DESCRIPTION OF THE PREFERRED EMBODIMENT

Figure 1:
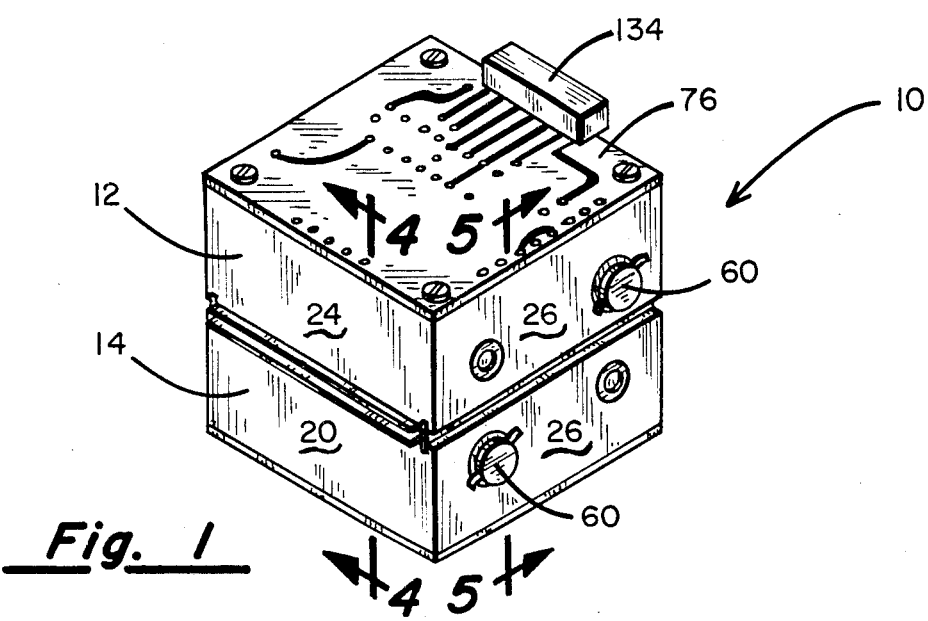
FIG. 1 is a perspective view of the card reader assembly of the present invention.

Referring first to FIG. 1, there is indicated generally by numeral 10 a document reading assembly constituting the preferred embodiment of the present invention. The assembly is seen to include a first or upper housing half 12 and a second or lower housing half 14. As can be seen from FIG. 2, the housing halves 12 and 14 are substantially identical in their construction, each having an open top as at 16, a bottom walCl 18 and four mutually perpendicular side walls 20, 22, 24 and 26.

Figure 2:
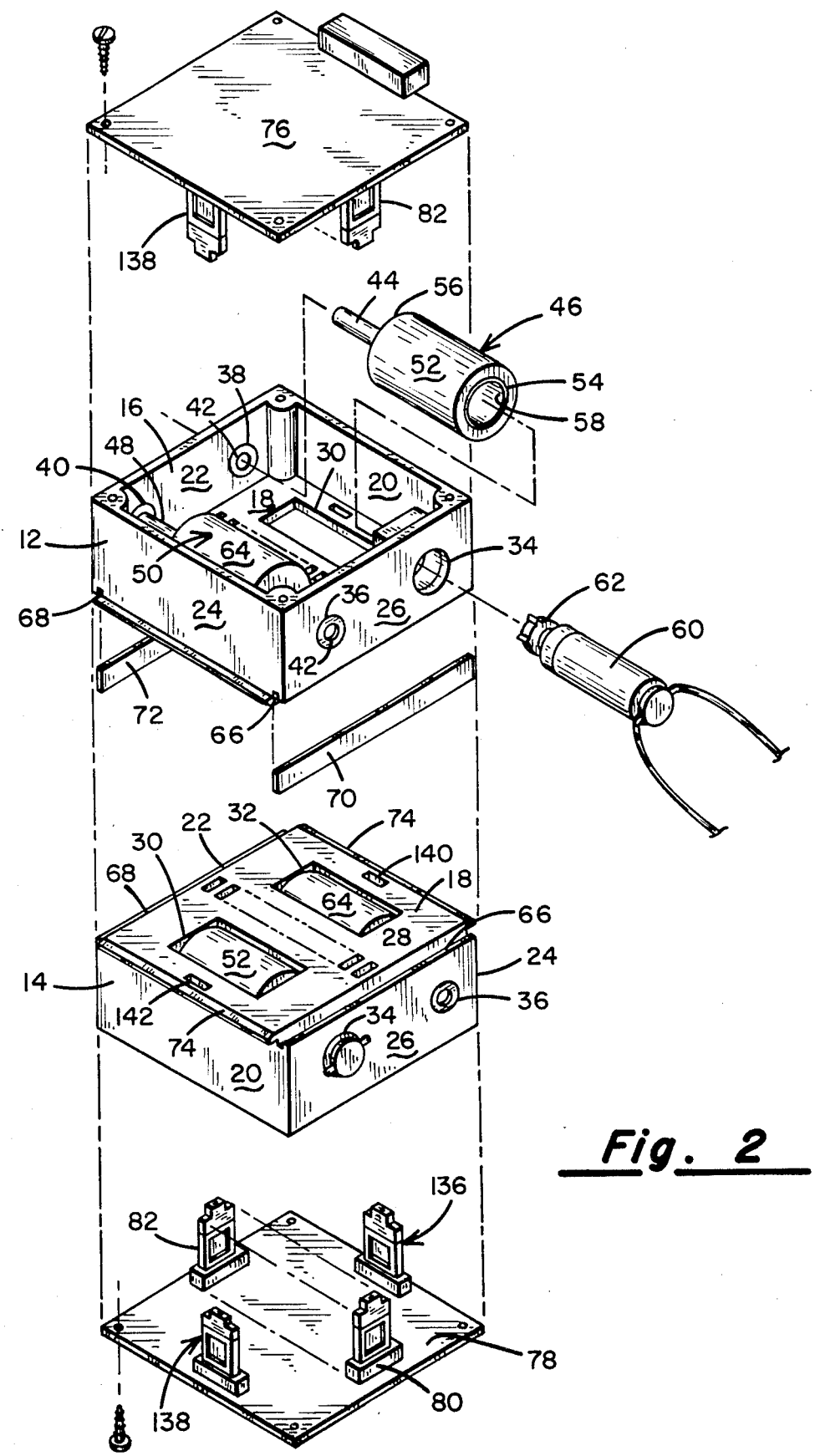
FIG. 2 is a blown-apart perspective view of the preferred embodiment.

As can further be seen from FIG. 2, formed through the thickness dimension of the bottom walls 18 of each housing half are a plurality of aligned rectangular apertures 28 which extend in a row approximately midway between the side walls 20 and 24. As will be explained in greater detail hereinbelow, the number of such apertures corresponds to the number of readable data locations in a column of the card to be read (not shown).

In addition to the apertures 28, there is also formed in the bottom wall 18 generally symmetrically on opposite sides of the row of apertures, first and second rectangular openings 30 and 32. Formed through the side walls 22 and 26 in general alignment with the longitudinal center line of the apertures 30 and 32 are circular bores 34, 36, 38 and 40. Fitted into the bores 36, 38 and 40 are bushing or bearing assemblies as at 42 for rotationally supporting the shaft 44 of a motor-driven roller means 46 and both ends of a shaft 48 of an idler roller means 50.

With attention being directed to the construction of the motor driven roller 46 in FIG. 2, it is seen to comprise a tubular roller member 52 which is preferrably fabricated from a suitable rubber-like material exhibiting a high coefficient of friction and which has a longitudinal bore 54 extending inwardly from a first end thereof but falling short of the opposed closed end 56 into which the shaft 44 is fitted. Disposed within the longitudinal bore 54 of the roller member 52 is a cylindrical tubular sleeve 58 which is preferably fabricated from a rigid material such as metal or plastic.

When the shaft 44 of the motor-driven roller 46 is inserted in the bearing 42 in the bore 38 formed in the side wall 22, a small cylindrical electrical motor 60 may be inserted through the bore 34 and, because the diameter of the motor 60 is slightly less than the inside diameter of the sleeve 58, the motor 60 will telescopingly fit within the sleeve 58 to the point where the coupling member 62 secured to the motor's output shaft can fit within a splined opening (not shown) formed in the inside surface of the closed end 56 of the roller member 52. By using this flexible, slipfit coupling between the motor and the drive roller, there is a reduced wear on the drive system in that torque is transmitted through the shock absorbing, rubber-like, drive roller material. Further, difficulties in assembly are reduced in that the flexible slip-fit coupling permits wide tolerance variations. When the motor shaft and drive roller are so coupled, a portion of the periphery of roller 52 will project slightly through the rectangular opening 30, as perhaps can best be seen in the cross-sectional views of FIGS. 4 and 5.

The idler roller means 50 simply comprises a cylindrical piece of rubber-like material 64 mounted on a central axle 48, that axle being journaled for rotation in the bearings 42 disposed in the bores 36 and 40 formed through the side walls. Again, the dimensions are such that a portion of the periphery of the idler roller 64 will project through the rectangular opening 32 formed in the bottom wall of each of the housing halves 12 and 14.

With continued attention being directed to FIG. 2, it will be noticed that cut inwardly of the side walls 22 and 26 and through the thickness of the bottom wall 18 are longitudinal kerfs or slots 66 and 68 into which are fitted spacer members 70 and 72. The spacer members 70 and 72 have a width designed to provide a predetermined gap between the opposed outer surfaces of the bottom members 18 on the mating housing halves 12 and 14. Thus, when the two housing halves are clamped together in the manner indicated with the opposed edges of the spacers 70 and 72 fitted into the kerfs 66 and 68, a gap, corresponding to the thickness of the document to be read may be established between the opposed bottom surfaces with the spacers 70 and 72 defining the width of the card receiving gap. Furthermore, proper selection of the durometer value of the roller material readily accommodates any variation in card thickness tolerance such that the spacers 70 and 72 need only bring the desired card gap into close (rather than exact) conformance to the card thickness.

Figure 4:
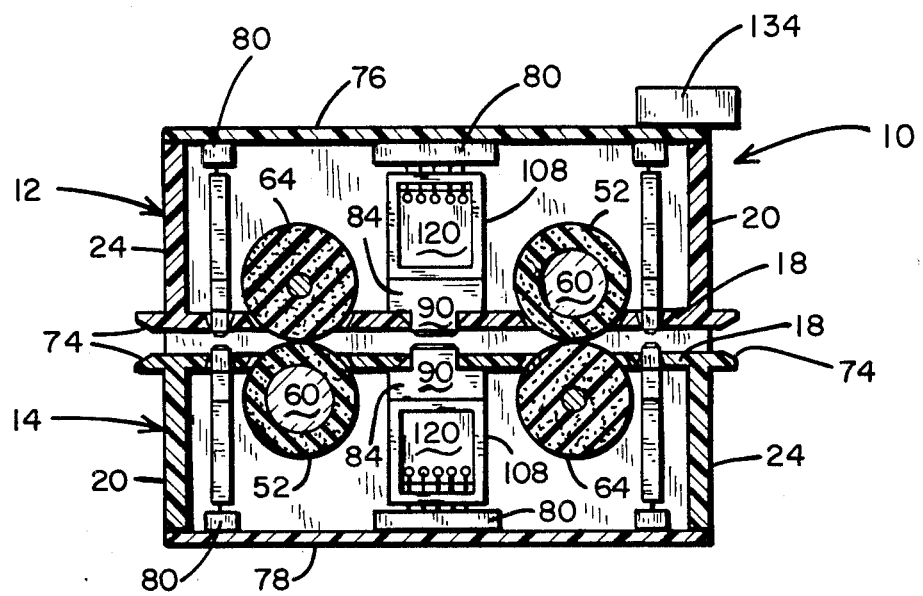
FIG. 4 is a sectional view taken along the lines 4—4 in FIG. 1.

To facilitate the insertion of a data card into the thus-formed gap, it can be noted from FIGS. 1 and 4 that the bottom wall 18 of each housing half extends outwardly beyond the opposed side walls 20 and 24 with the extensions being chamfered as at 74 to form a funnel-like entry point for the card.

It may also be noted from FIG. 4 that the housing halves are oriented such that the motor-driven roller 52 of the upper housing half 12 coacts with the idler roller 64 of the housing half 14 while the motor-driven roller 52 of housing half 14 coacts with the idler roller 64 of the housing half 12. In each instance, the coaction is such that a pinch roller combination results. The figures illustrate the motor-driven roller/idler roller combinations are in line-contact across the card reading gap defined by the spacers 70 and 72. By properly choosing the durometer value for the rubber-like material comprising the surfaces of these roller pairs, a document, such as a punched or printed card, will be able to pass therebetween as the motor causes the motor-driven roller to rotate.

Serving as covers for the open ends 16 of the housing halves 12 and 14 are printed circuit boards 76 and 78 which are screwed or otherwise fastened in place as shown in FIG. 1. These printed circuit boards contain various electrical components and interconnecting conductors, all as is well known in the art. More particularly, a plurality of electrical connectors as at 80 are affixed to the undersurfaces of the printed circuit boards 76 and 78 with their associated connector terminals being soldered to conductive land areas on the printed circuit board. The connectors 80 are disposed in a row and are intended to receive a corresponding plurality of photo-optic transducing head assemblies, such as is indicated generally numeral 82 in FIG. 3.

Figure 3:
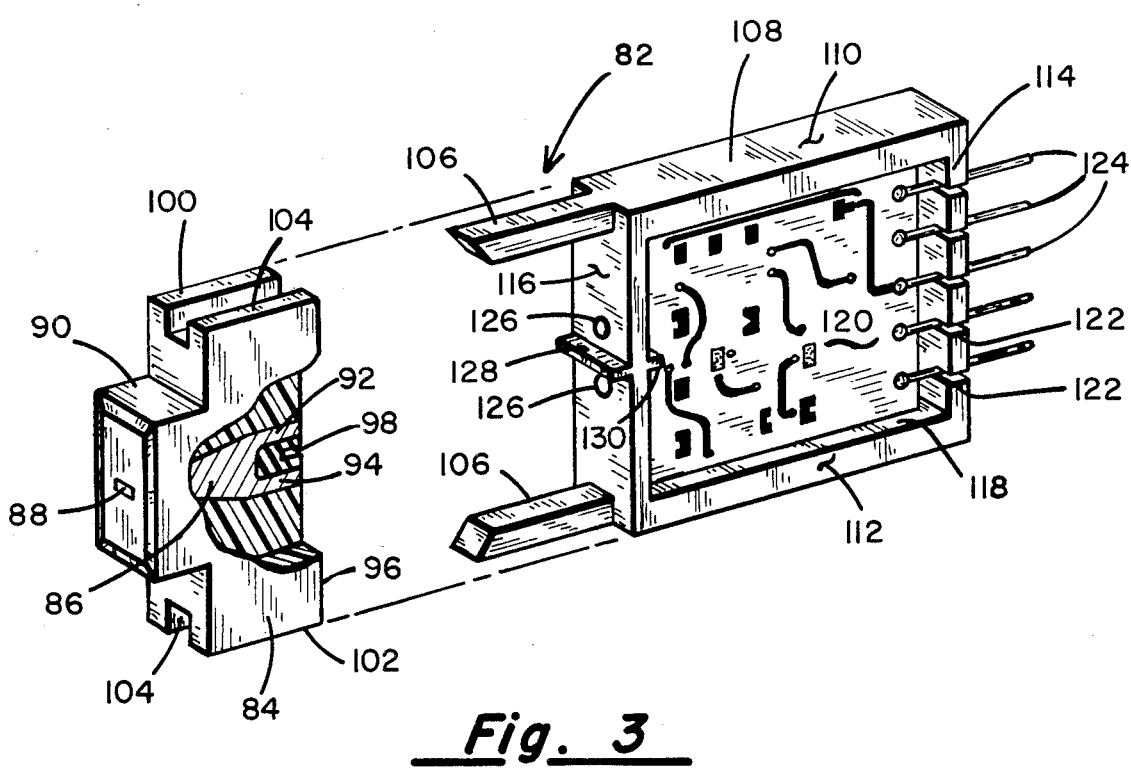
FIG. 3 is a blown-apart view of the photo-optic transducing head assembly used in the embodiment of FIG. 1.

Referring to FIG. 3, it can be seen that each of the photooptic transducing head assemblies comprises a block of opaque plastic material 84, such as plastic potting compound, which is molded about a bifurcated light guide which preferably includes a bundle of fiber-optic rods 86. Rather than consisting of a plurality of fiber-optic rods grouped into a bundle, the light guide may also be a solid, molded plastic member configured so that incident light entering same is totally internally reflected, until reaching an exit end. The stem portion of the fiber-optic bundle is exposed through a window 88 formed centrally in a boss 90 projecting outwardly from the base of the opaque block 84. Similarly, the individual branches 92 and 94 of the bifurcated fiber-optic rod bundle are exposed at spaced-apart points along the edge surface 96 of the block 84. A transversely extending slot 98 is cut in the block of opaque material between the branches 92 and 94 of the fiber-optic bundle.

The side edges 100 and 102 of the block 84 have a longitudinal recess 104 formed therein for receiving the projecting legs 106 of a ceramic circuit card frame member 108. The frame means 108 comprises an integrally molded structure having four mutually perpendicular side members 110 through 116 which define a rectangular opening 118 for receiving a hybrid ceramic circuit substrate 120. The side member 114 has a plurality of spaced notches 122 formed inwardly from one edge surface thereof and the spacing between the notches 122 correspond to the spacing between the terminal pins 124 of the ceramic hybrid circuit card 120. The side member 116 opposite from the side member 114 includes a pair of spaced apertures as at 126. The spacing between these apertures corresponds to the spacing between the windows on the edge 96 of the block 84 through which the individual branches 92 and 94 of the fiber-optic bundle are exposed. Hidden from view in FIG. 3 are a light-emitting diode (LED) and a photo transistor. These two devices are located on the thin edge surface of the ceramic card 120 and are spaced apart from one another by a distance which corresponds with the center-to-center spacing between the apertures 126. As such, when the ceramic card 120 is inserted in the frame member 108 with its terminal pins 124 extending through the notches 122 formed in the frame, the light-emitting diode and the photo transistor (neither shown) are aligned with the apertures 126. Then, when the block member 84 is secured to the frame 108 by having the extension legs 106 fitted into the grooves 104, the LED and the photo transistor will also be aligned with the branches 92 and 94 of the fiber-optic rod bundle 86. Those skilled in the art will also recognize that the frame 108 and the block member 84 can be integrally formed in a molding operation and need not be separable as shown in the drawings.

The ceramic circuit card 120 contains a number of active and passive circuit components (including integrated circuit chips) along with the conductive interconnects for completing the electronic circuitry for causing the LED to emit light and for converting light received by the photo transistor into usable output signals.

In order to preclude "cross-talk", i.e., a direct transmission of light from the edge located LED and photo transistor, integrally molded on the side member 116 of the frame are transversely extending webs 128 and 130 which are intended to mate with corresponding transverse slit 98 on block 84 and a slit formed in the edge of the ceramic card 120 approximately midway between the light-emitting and light-sensing devices formed on the ceramic card's edge.

Now that the details of construction of the photo-optic transducing head assembly have been described in detail, consideration is again directed to FIGS. 2, 4 and 5 which show the manner in which these transducing heads are mounted within the card reader assembly itself. Specifically, the terminal pins 124 of the transducing head assembly are arranged to be plugged into the electrical connectors 80. There would be one such connector/transducing head assembly for each data channel defining a column on the document to be read. When the printed circuit card 78 is affixed to its respective housing half, the boss 90 (FIG. 3) of the transducing head will project through a corresponding aperture 28 formed in the bottom wall 18 of each of the housing halves 12 and 14. As such, a card to be read passing through the space between housing halves will have its data channels aligned with the windows 88 on each of the aligned transducing heads.

In most applications where the data is carried by the card in the form of hole patterns, the card reader electronics will be arranged such that the edge-mounted LED of the transducing heads in one of the housing halves will be energized while the photo transistor sensing circuitry of the transducing heads mounted in the other housing half will be operative. As such, light transmitted through the hole patterns in the card will be picked up by the photo sensor on the opposite side of the card and the data read in that fashion. Where, however, the indicia or information carried by the card is in the form of printed marks rather than holes, that indicia can be read from one side of the card only. In this regard, light from the edge-mounted LEDs of the transducing heads will pass through one of the apertures 126 in the frame and through one of the bundle branches 92 or 94 will be projected out from the window 88. The reflected light from the mark on the card will, in turn, pass through the fiber-optic rods of the bifurcated bundle back to the photo sensor. Of course, it will be apparent to those skilled in the art that it is also possible with the device of the present invention to provide double-sided reading of the document (card) having printed marks on both sides of that card. Here, both upper housing half 12 and lower housing half 14 would be populated with transducing head arrangements such as shown in FIG. 3.

Figure 5:
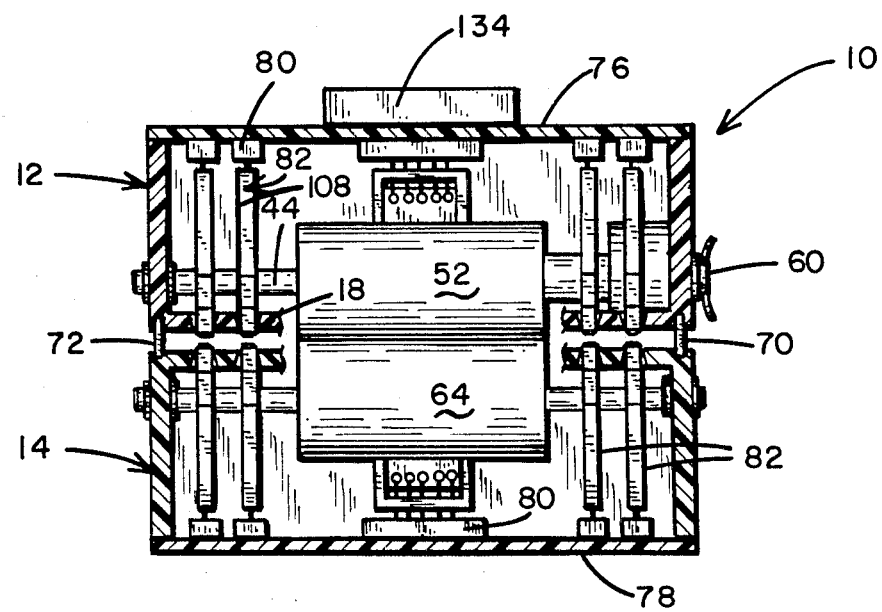
FIG. 5 is a cross-sectional view taken along the lines 5—5 in FIG. 1.

Returning again to a description of the mechanical construction of the card reading assembly of the present invention, it is to be noted from FIG. 5 that each of the transducing head assemblies 82 has its boss portion 90 extending through one of the apertures 28 in the bottom wall of each of the housing halves and that the terminal pin portions of those transducing head assemblies are firmly mounted within suitable electrical connectors affixed to the printed circuit cards 76 and 78. This form of construction is extremely rugged and provides a high measure of support and isolation against shock and vibration. In practice, it has been found convenient to locate a suitable electrical connector as at 134 on the printed circuit board 76 such that the signals processed by the circuitry on the ceramic cards 120 can be brought out, via a flexible cable or the like, to the data processing system that is to use the information being read. The other printed circuit board, say 78, can then be used to mount those components and circuit elements comprising the motor control circuitry governing the energization of the respective drive motors 60 in the lower and upper housing halves for first advancing the card to be read through the reading station and for subsequently returning the card to the user. In this regard, further transducing head assemblies 136 and 138 are arranged such that the fiber-optic window thereof pass through apertures 140 and 142 in the bottom walls proximate the front and rear edges thereof whereby the leading and/or trailing edges of the card being read can be sensed.

The housing members 12 and 14 may be fabricated from a variety of suitable materials. Where it is desired to reduce or prevent electrostatic charge buildup and attendent electrostatic discharge problems, the housing may preferably be fabricated from a conductive material. By completing enclosing the unit with a grounded, conductive material and properly shielding the input-/output conductors, electromagnetic interference (EMI) and radio frequency interference (RFI) can be controlled.

In that the motor-control circuitry itself is not deemed to be a part of the present invention, it is not deemed necessary to explain in detail the layout and mode of operation of that circuitry. Similarly, in that the present invention is more concerned with the packaging aspects of the card reader assembly, it is also not deemed essential to describe the layout and mode of operation of the circuitry comprising the transducing head ceramic card.

While the preferred embodiment of the invention has been described as utilizing a photo-optic readout, other types of readouts, such as magnetic and electromechanical may also be used. The invention has been illustrated and described as embodied in a specific arrangement. However, it is not intended to be limited to the details shown, since various modifications and structural changes may be made without departing in any way from the spirit or basic concept of the present invention.

The embodiments of the invention in which an exclusive property or privilege is claimed are defined as follows:

1. Document reading apparatus comprising in combination:
   (a) first and second housing means each having an open top, a bottom wall and four mutually perpendicular side walls, said bottom walls of said housing means each having a plurality of spaced-apart, aligned apertures extending in a row transversely thereacross and a pair of generally rectangular openings symmetrically disposed on opposite sides of said row of apertures;
   (b) motor-driven roller means journaled for rotation between opposed pairs of side walls on each of said first and second housing means, said motor-driven roller means being aligned with and extending partly through one of said pair of generally rectangular openings;
   (c) idler roller means journaled for rotation between said opposed pairs of side walls on each of said first and second housing means, said idler roller means being aligned with and extending partly through the other of said pair of generally rectangular openings;
   (d) a plurality of photo-optic transducing heads disposed within each of said first and second housing means, each partially projecting through one of said plurality of spaced-apart, aligned apertures;
   (e) first and second printed circuit cards secured across said open top on said first and second housing means each of said cards including a plurality of electrical connectors mounted thereon, said plurality of photo-optic transducing heads being plugged into said corresponding plurality of electrical connectors; and
   (f) means coupling said first and second housing means one to the other with said bottom walls spaced from one another by a predetermined distance corresponding generally to the thickness of the document to be read and with the motor-driven roller means in said first housing means being aligned with said idler roller means in said second housing means.

2. The document reading apparatus as in claim 1 wherein said motor-driven roller means comprises:
   (a) a hollow cylindrical sleeve having one open end and one closed end;
   (b) an axle extending outwardly from said closed end of said sleeve;
   (c) a generally cylindrical electrical motor at least partially disposed within said open end of said sleeve, said axle being journaled in one of said opposed pairs of side walls and said motor means having a portion thereof held fixed relative to the other of said opposed pairs of side walls.

3. The document reading apparatus as in claim 2 wherein said hollow cylindrical sleeve comprises a rubber material of a predetermined durometer.

4. The document reading apparatus as in claim 3 wherein said hollow cylindrical sleeve further includes a rigid tubular member fitted within said hollow sleeve.

5. The document reading apparatus as in claim 2 wherein said cylindrical electrical motor has an axially extending shaft which is keyed to said hollow cylindrical sleeve.

6. The document reading apparatus as in claim 1 wherein said photo-optic transducing heads each includes:
   (a) a bifurcated light guide embedded in a block of opaque material, a portion of said block being fitted in one of said plurality of apertures, one end of said light guide terminating in a window in a working face of said portion of said block, the separate branches of said bifurcated light guide terminating in spaced-apart windows in an opposed face of said block;
   (b) a ceramic hybrid circuit substrate having active and passive circuit components affixed to at least one major surface thereof, terminal pins extending from a first side edge thereof, and light-emitting means and light-sensing means disposed on a second side edge thereof; and
   (c) frame means for holding said second side edge of said substrate in predetermined registration with said block of opaque material, said light-emitting means and said light-sensing means being aligned with said spaced-apart windows.

7. The document reading apparatus as in claim 6 and further including an optical barrier disposed between said light-emitting means and said light-sensing means and extending into said block of opaque material between said separate branches of said bifurcated bundle.

8. The document reading apparatus as in claim 6 wherein said frame means comprises:
   an integrally molded structure having four mutually perpendicular side members defining a rectangular opening for receiving said hybrid circuit substrate therein, a first of said side members having a plurality of spaced notches formed inwardly from one edge thereof, the spacing between notches corresponding to the spacing between said terminal pins, a second side member opposite said first side member having a pair of spaced apertures, the spacing between apertures corresponding to the spacing between said light-emitting means and said light-sensing means when said hybrid circuit substrate is positioned in said frame with said terminal pins extending through said notches.

9. The document reading apparatus as in claim 6 wherein said bifurcated light guide comprises a bundle of fiber-optic rods.

10. The document reading apparatus as in claim 8 in which a third and fourth of said side members of said frame means are of a length so as to project beyond said second side member whereby said block of opaque material fits between extensions of said third and fourth side members beyond said second side member.

11. The document reading apparatus as in claim 10 wherein said block of opague material has longitudinal grooves formed in opposed side edges thereof for receiving said extensions.

* * * * *